Jan. 15, 1924.

T. A. SINDELAR ET AL 1,481,071

AUTOMATIC WELDING DEVICE

Filed May 2, 1921

Inventor
T. A. Sindelar
S. S. Daykin

By Lloyd L. Evans
Attorney

Patented Jan. 15, 1924.

1,481,071

UNITED STATES PATENT OFFICE.

THOMAS A. SINDELAR AND SPENSLEY S. DAYKIN, OF CLEVELAND, OHIO, ASSIGNORS TO THE HYDRAULIC STEEL COMPANY, OF CLEVELAND, OHIO, A CORPORATION OF OHIO.

AUTOMATIC WELDING DEVICE.

Application filed May 2, 1921. Serial No. 466,209.

*To all whom it may concern:*

Be it known that we, THOMAS A. SINDELAR and SPENSLEY S. DAYKIN, citizens of the United States, residing at Cleveland, in the county of Cuyahoga and State of Ohio, have invented a certain new and useful Improvement in Automatic Welding Devices, of which the following is a full, clear, and exact description, reference being had to the accompanying drawings.

This invention relates to machines for automatically welding articles such as axle housings in which the seam to be welded does not lie in a straight line. It is the object of this invention to provide a machine in which such a seam can be traversed from end to end by the welding device and automatically welded.

In the drawing forming a part of this specification,

Figure 1:
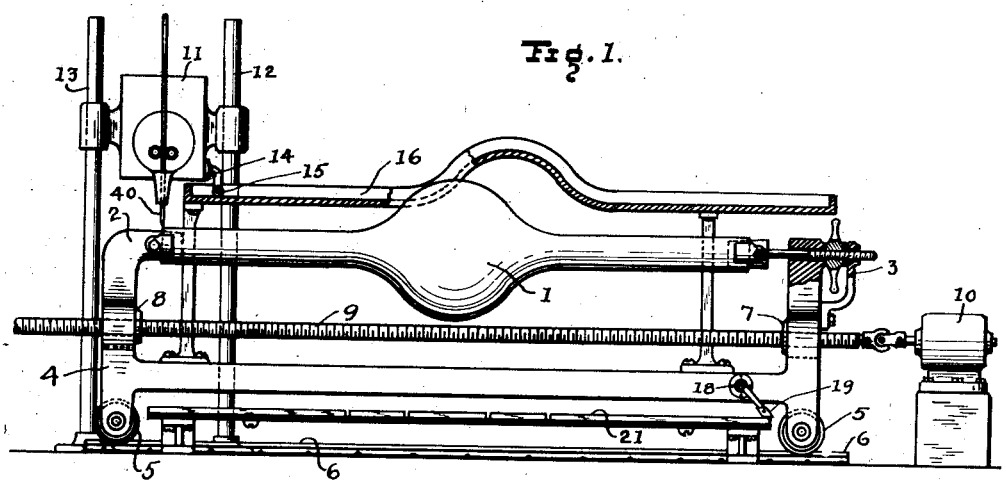
Figure 1 is a side elevation of the machine.
Figure 2:
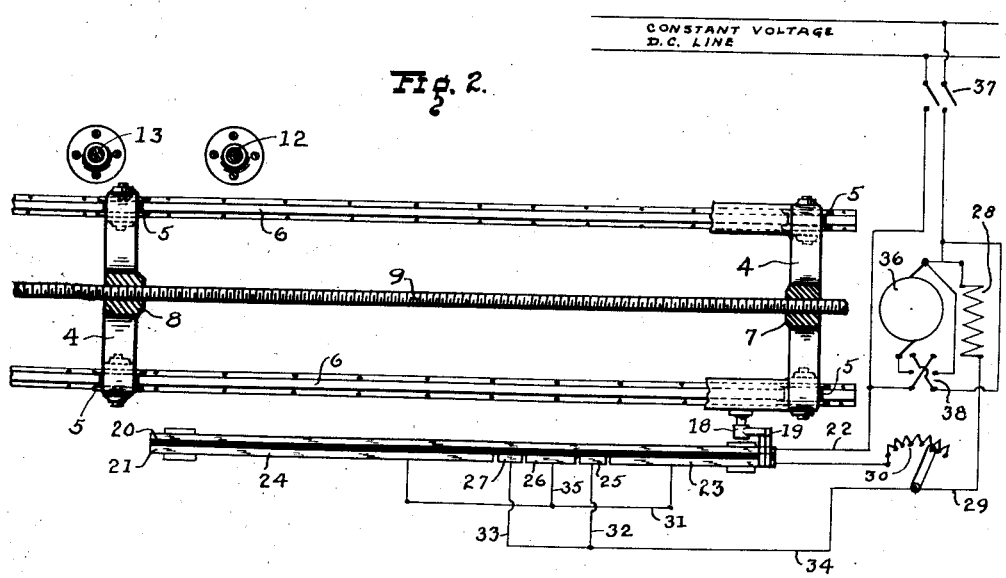
Fig. 2 is a diagrammatic view showing the electrical connections for controlling the speed of the carriage shifting motor.

In the drawings the axle housing 1 is rigidly clamped between the uprights 2 and 3 of the carriage 4. The carriage 4 is provided with wheels 5 running on a track 6. For moving the carriage during the welding operation the uprights 2 and 3 carry nuts 7 and 8 which engage with a longitudinal threaded rod 9 which is driven in either direction by an electric motor 10.

A welding head 11 preferably of the automatic arc welding type is slidably mounted upon vertical posts 12 and 13. The welding head 11 is supported and maintained at a fixed distance from the upper surface of the axle housing by means of an arm 14 carrying a roller 15 traveling in a grooved cam track 16 rigidly mounted on the carriage 4. The cam track 16 is curved to correspond to the curvature of the axle housing in order to maintain the head 11 at a fixed distance from the seam.

The cam track 16 is preferably detachably connected to the carriage to permit attachment of other cam tracks corresponding to the contour of differently shaped housings.

The housing 1 is held in place by means of a clamp 17 which permits the ready insertion of parts to be welded and ready removal thereof and also permits the housing to be turned over after the carriage has completed its travel in one direction to bring the opposite seam into position to be welded on the return movement of the carriage.

The carriage 4 is provided with an arm 18 carrying a brush 19 which slides upon a pair of parallel commutator bars 20 and 21 of sufficient length to contact with the brush throughout the movement of the carriage. The commutator bar 20 is continuous and is connected through the line 22 to the negative lead. The commutator bar 21 is sectional. The two end sections 23 and 24 of the bar 21 correspond in length with the straight portions of the housing. Between the end sections 23 and 24 are three short sections, 25, 26, and 27. The section 23 is connected with the shunt field 28 of the motor through the line 29 and shunt resistance 30. The section 24 is connected through line 31 with the section 23. The sections 25 and 27 are connected through lines 32 and 33 to line 34 which is in turn connected to the line 29. The central section 26 is connected through lines 35 and 31 to the sections 23 and 24.

The sections 23 and 24 are so arranged that the brush 19 is in contact therewith while the straight portions of the seam at the ends of the housing are being welded. The sections 25 and 27 are so arranged that the brush 19 is in contact therewith while the opposite sides of the curved portion of the seam are being welded. The section 26 is so arranged that the brush 19 is in contact therewith while the top of the curved portion of the seam at the center of the housing is being welded.

While the brush 19 is in contact with the section 23 of the sectional commutator bar current flows from the positive line through the motor field 28, line 29, shunt field resistance 30 to section 23 across brush 19 to bar 20 and line 22 to the negative lead.

While the brush 19 is in contact with the intermediate section 25 current flows through field 38, lines 29, 34 and 32 to the section 25 across brush 19 to bar 20 and through line 22 to the negative lead.

While the brush 19 is in contact with the central section 26 current flows through field 38, line 29, resistance 30, section 23, lines 31 and 35 to the section 26 across brush 19 to bar 20 and through line 22 to the negative lead.

While the brush 19 is in contact with the section 27 current flows through field 28, lines 29, 34 and 33 to section 27, across brush 19 to bar 20 and through line 22 to the negative lead.

While the brush 19 is in contact with the end section 24 current flows through field 28, line 29, resistance 30, bar 23, line 31 to section 24, across brush 19 to bar 20 and through line 22 to the negative lead.

The motor armature 36 is at all times directly connected across the line.

When the straight end portions and the top of the curved portion are being welded the resistance 30 is in circuit with motor shunt field. While the steeper portions of the ascending and descending portions of the seam are being welded the resistance 30 is cut out of the motor shunt field circuit and the speed of the motor is retarded.

A cut out switch 37 and a reversing switch 38 are provided for controlling the motor.

Figure 3:
Fig. 3 is a speed diagram showing the relation of the motor speed to the various portions of the curved seam.

As shown diagrammatically in Fig. 3, the speed of the motor is so controlled as to maintain a substantially constant rate of movement of the seam past the welding head. The very slight variations indicated by the digram are at no point sufficient to interfere with effective welding throughout the curved portion of the seam.

The sectional commutator bar 21 is removably mounted and may be replaced with another bar whose sections are of different relative lengths to correspond to a different curve on a differently shaped housing and the resistance 30 is adjustable to obtain the proper speed reduction for the particular housing to be welded.

The welding head 11 is preferably of the automatic arc welding type in which a metallic wire electrode 40 is fed in such a manner as to automatically strike the arc and to maintain a substantially uniform arc during the movement of the work therebeneath.

In operation the housing 1 is clamped between the uprights 2 and 3 of the carriage 4, with the advance end of the housing directly beneath the electrode 40. The electrode feed mechanism and the carriage shifting motor 10 are then simultaneously started and the seam of the housing is welded as it passes beneath the electrode 40. When the upwardly curved portion of the housing is reached the resistance 30 is cut out of the motor shunt field circuit, as above described, reducing the speed of the motor and maintaining a substantially uniform rate of movement of the seam with respect to the electrode. When the electrode 40 nears the top of the curve the resistance 30 is cut into the motor shunt field circuit and the motor operated at normal speed. When the electrode 40 reaches a certain point on the descending side of the curve the resistance 30 is again cut out, reducing the speed of the motor until the horizontal portion of the seam is reached where the resistance 32 is again cut in and the motor 10 operates at normal speed. The straight portion of the seam at the opposite end of the housing then passes beneath the electrode and is welded. When the carriage has completed its movement in one direction the housing can be turned over and welded on the opposite side during return movement of the carriage.

While I have shown for the purpose of illustrating my invention an application thereof to welding axle housings my invention is clearly applicable to the welding of a great many other articles in which the seam does not lie in a straight line. While I have shown my invention in connection with an automatic arc welding head, it is useful in connection with other types of welding devices. I, therefore, wish it to be distinctly understood that this invention is not limited in its application either to welding of axle housings or to use in connection with automatic arc welding machines.

What I claim is:

1. A welding machine for welding an article along a seam, portions of which lie in different horizontal planes, comprising a welding device, means for presenting portions of the seam progressively to said device while maintaining the relative position of the seam with respect to said welding device and means for maintaining a substantially constant rate of movement of the seam with respect to the welding device.

2. A welding machine for welding an article along a seam, portions of which lie in different horizontal planes, comprising a vertically movable welding device, a horizontally movable carriage for moving said article past said welding device, means for moving said welding device vertically to conform to the contour of the article to be welded and means for varying the rate of movement of said carriage to maintain a substantially uniform movement of the seam past the welding device.

3. A welding machine comprising a horizontally movable carriage provided with means for supporting an axle housing with the seam to be welded extending along the top thereof, a vertically movable welding device and a cam mounted on the carriage and engageable with said welding device to maintain the relative position thereof with respect to the seam.

4. A welding machine for welding articles along a seam, having upwardly and downwardly extending portions comprising an automatic welding head, means for moving the article past said head, means for maintaining the relative position of said head with respect to said seam, and means for varying the rate of movement of said article moving means to maintain a substantially constant movement of said seam past said welding head.

5. In a welding machine a welding device, a holding device for the article to be welded, means for moving one of said devices with respect to the other to progressively present different portions of the article to the welding device and means for varying the speed of said moving means during a predetermined portion of its movement.

6. In a welding machine, an article supporting carriage, a welding device, means for moving said carriage horizontally past said welding device, means for shifting said welding device during a portion of the movement of the carriage and means for retarding the movement of the carriage during the shifting movement of welding device.

7. In an automatic arc welding machine, a vertically shiftable automatic arc welding head, a horizontally movable carriage for supporting an axle housing, means carried by said carriage for shifting said welding head to conform to the contour of the axle housing, an electric motor for moving said carriage, and means controlled by said carriage to vary the speed of said motor.

8. In an automatic arc welding machine, a movable automatic arc welding head, a movable carriage for supporting an article to be welded, moving means for causing successive portions of said article to be presented to said welding head, means for maintaining the welding head at a fixed distance from the portion of the article being welded and means to vary the rate of movement of said moving means to maintain a substantially constant rate of movement of successive portions of said article with respect to said head.

9. In an automatic arc welding machine, an automatic arc welding head, means for supporting an article to be welded adjacent said head, moving means for presenting successive portions of said article to said welding head, means for maintaining said head at a fixed distance from the portion of the article being welded and means for varying the rate of movement of said moving means to maintain a substantially constant rate of traverse of the said head over successive portions of the article.

10. In a welding machine, a welding device, a reciprocable carriage, means on the carriage for supporting an article to be welded along symmetrical seams on opposite sides thereof, means for reciprocating carriage and means for causing said head to follow the contour of the seam, said supporting means being adjustable to permit the opposite seam to be welded on the return movement of the carriage.

11. The herein described method of welding an article having a seam, portions of which lie in different horizontal planes, which comprises moving said article in a horizontal direction past a welding device maintaining said welding device at a substantially fixed distance from said seam, and varying the speed of movement of said article to maintain a substantially constant rate of movement of the seam with respect to the welding device.

12. The herein described method of welding an article having a seam, portions of which lie in different horizontal planes, which comprises bringing successive portions of the seam beneath a welding device by a relative movement in a horizontal direction, simultaneously guiding said welding device to maintan it at a substantally fixed distance from said seam and simultaneously varying the rate of movement in a horizontal direction to maintain a substantially uniform rate of movement of the welding device with respect to the seam.

13. In a welding machine a welding device, a shiftable carriage for supporting an article to be welded, a motor for shifting the carriage, means for causing the welding device to follow the line of weld, a motor for moving the carriage and interchangeable means connected to the motor circuit to vary the speed thereof at predetermined portions of the travel of the carriage.

14. In a welding machine a welding device, a shiftable carriage for supporting articles to be welded, a motor for shifting the carriage, interchangeable guides for causing the welding device to follow a different lines of weld, and interchangeable means adapted to be connected in the motor circuit to vary the speed of the motor at predetermined portions of the travel of the carriage.

15. In combination, a work holding carriage, a motor for shifting the carriage, a resistance adapted to be connected in the motor circuit and means coacting with the carriage to connect or disconnect said resistance at predetermined points in the travel of the carriage to vary the speed of the motor.

16. In combination, a work holding carriage, a motor for shifting the carriage, a resistance, adapted to be connected in the motor circuit, a pair of commutator bars in the motor circuit, means carried by the carriage for bridging said bars, one of said bars being sectional, one or more of the sections connecting said resistance in the motor circuit to vary the speed of the motor.

In testimony whereof, we hereunto affix our signatures.

THOMAS A. SINDELAR.
SPENSLEY S. DAYKIN.